Patented Oct. 31, 1944

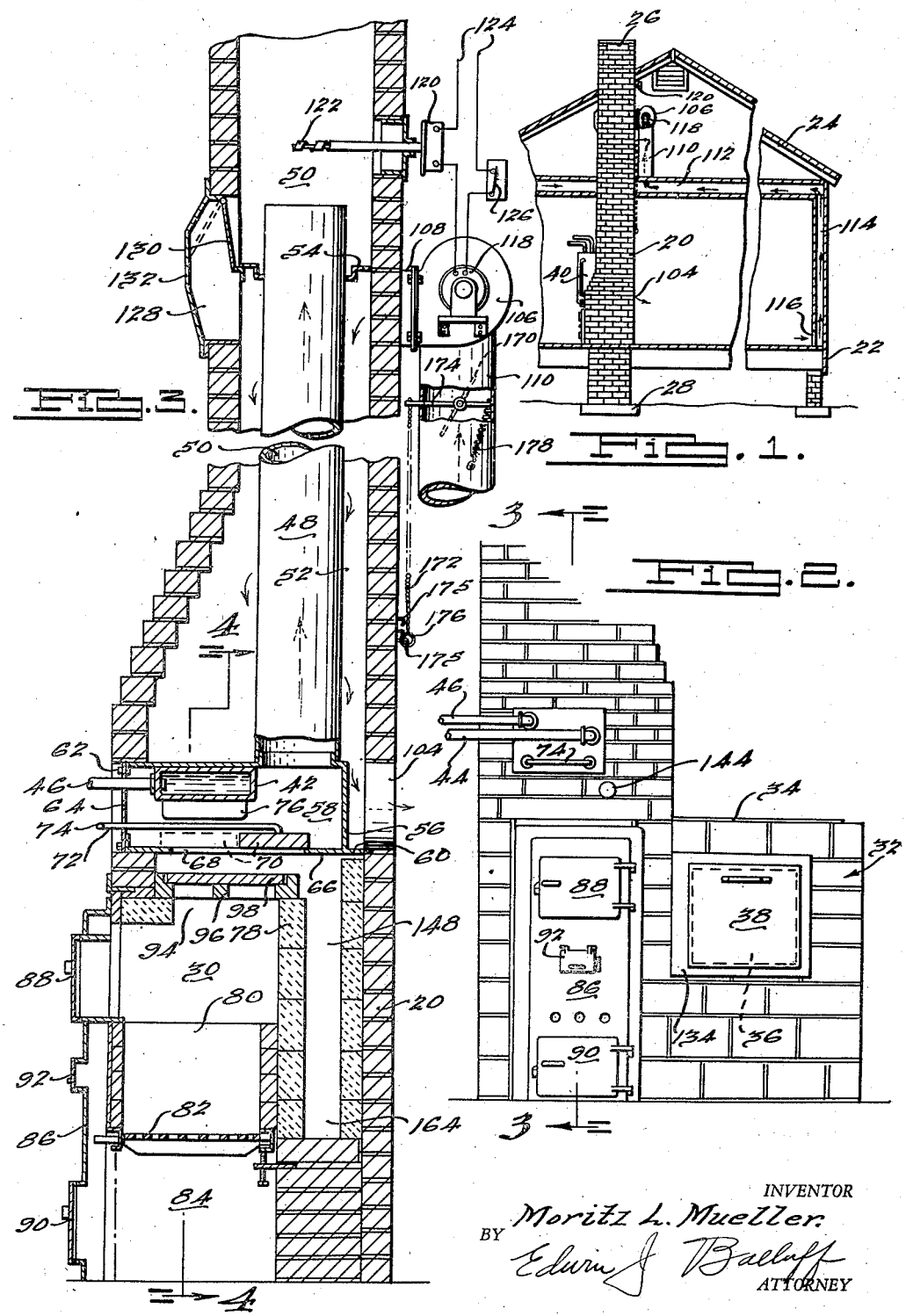

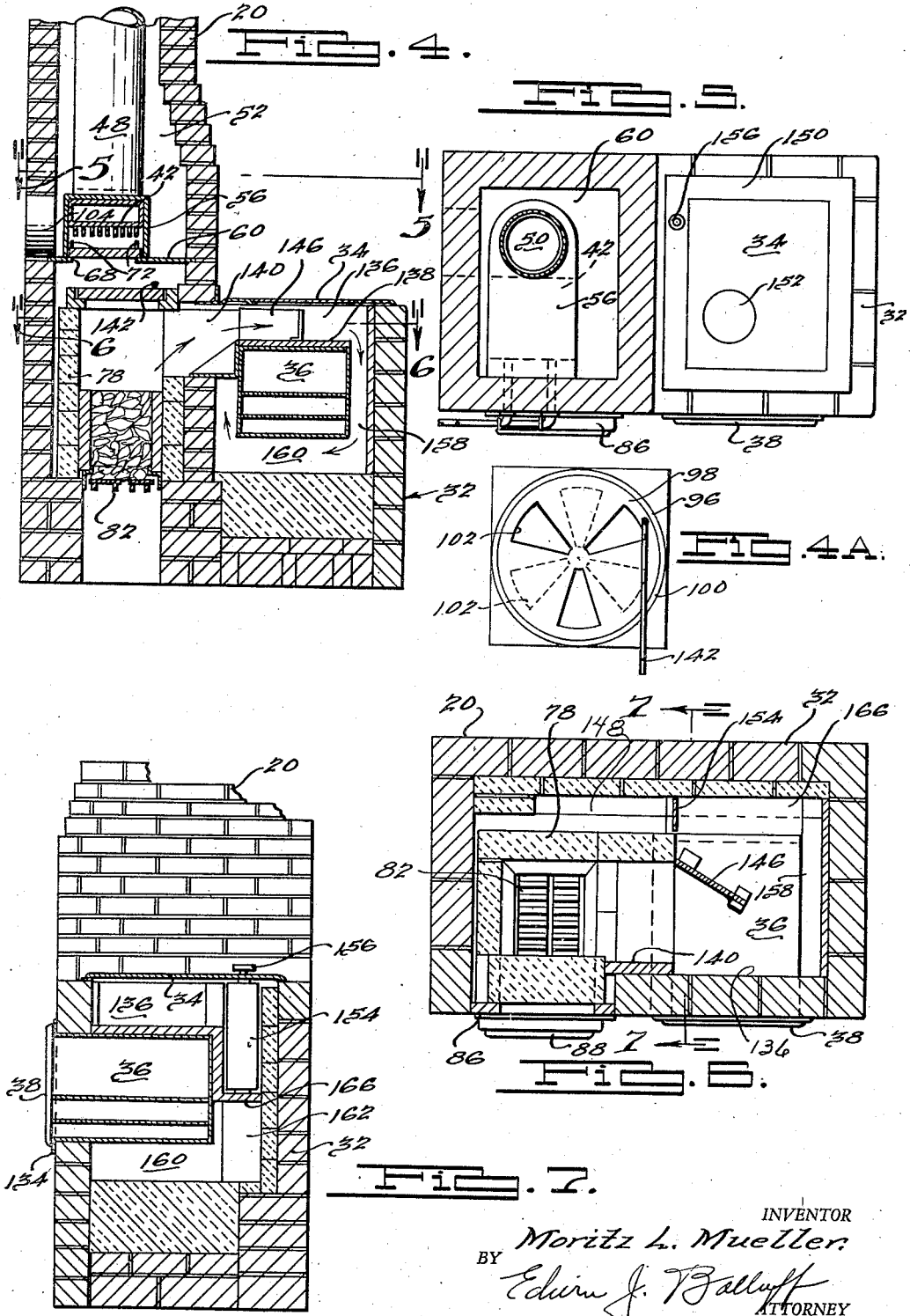

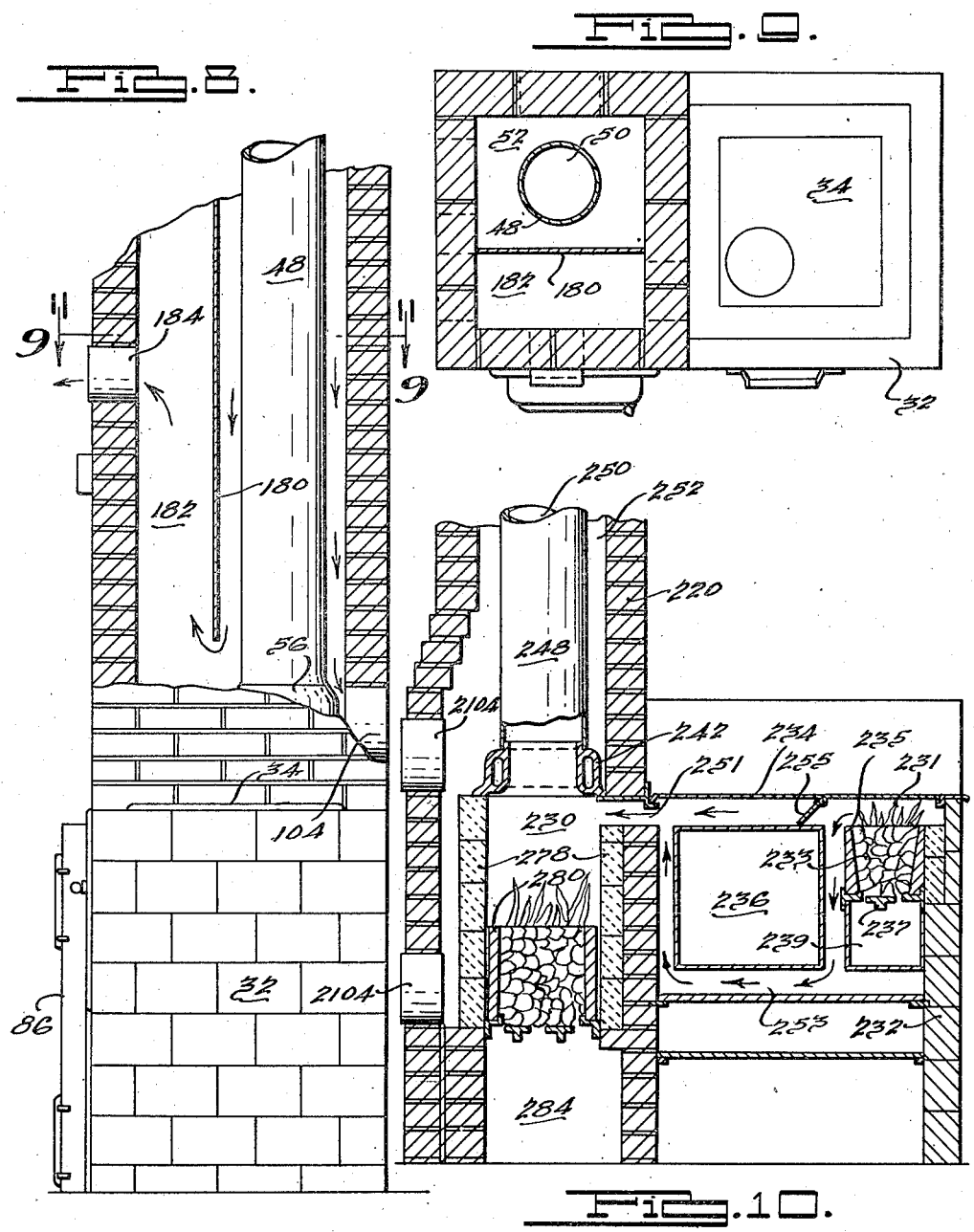

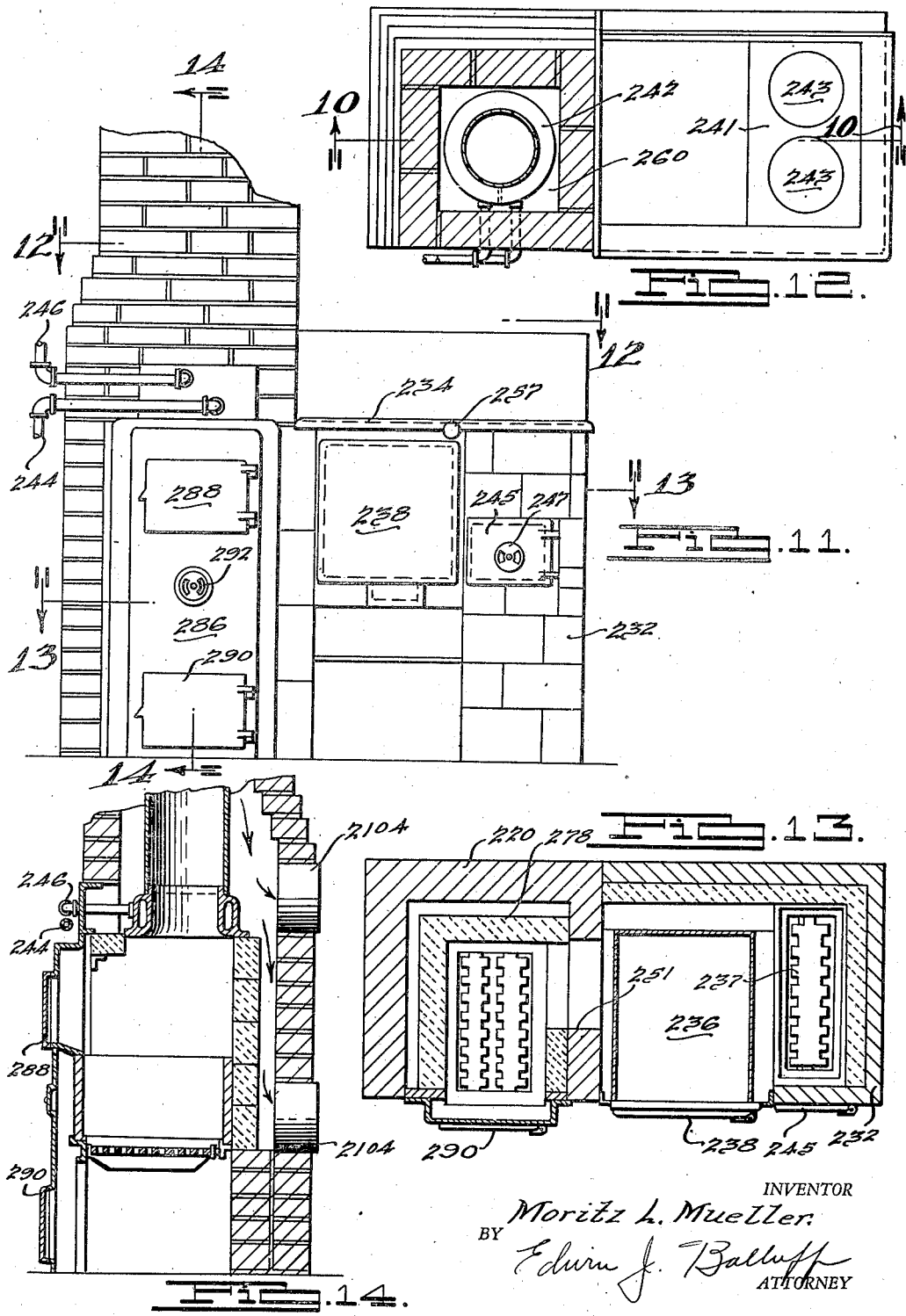

2,361,644

UNITED STATES PATENT OFFICE 2,361,644

HEATING AND COOKING APPARATUS

Moritz L. Mueller, Seattle, Wash., assignor, by mesne assignments, to Moritz L. Mueller and John H. Mueller, both of Seattle, Wash., as joint tenants Application January 11, 1943, Serial No. 472,063

20 Claims. (Cl. 237—2)

This invention relates to heating and cooking apparatus and system and has particular reference to a system for generating and utilizing combustion products for heating air, hot water, and for cooking purposes, and as illustrated in the embodiments of the invention selected for purposes of illustration, is particularly suitable for domestic use.

The invention herein disclosed and claimed constitutes an improvement upon that disclosed in my Patent No. 2,274,341, issued February 24, 1942.

A principal object of the invention is to provide a new and improved form of heating system and apparatus which is particularly adapted for heating air and water and for cooking purposes.

Another object of my invention is to provide such a system and apparatus in which the amount of metal used is relatively small as compared with the amount of metal now required for heating, cooking, and hot water systems now in use.

Another object of the invention is to provide a combination air and water heating and cooking apparatus in which means are provided for selectively controlling the utilization of the heat generated in the system so as to provide for air heating, water heating, and cooking functions, either individually or jointly.

Another object of the invention is to provide a system of the type herein disclosed which, because of its simplicity of construction and of its efficiency in operation, is particularly suitable for use in low cost homes so as to provide for air and water heating and cooking purposes.

Other objects and advantages of the invention will be apparent from a consideration of the following specification taken in conjunction with the accompanying drawings of which there are four sheets and wherein:

Fig. 1 is a somewhat diagrammatic vertical sectional view of a portion of a residence, illustrating a system embodying the invention herein disclosed applied thereto;

Fig. 2 is an enlarged front elevational view of the lower part of the apparatus;

Fig. 3 is a fragmentary vertical sectional view taken generally in the plane along the line 3—3 of Fig. 2, looking in the direction of the arrows;

Fig. 4 is a fragmentary vertical sectional view taken generally in a plane along the staggered line 4—4 of Fig. 3, looking in the direction of the arrows;

Fig. 4A is a plan view of the rotary damper which controls the flow of the combustion products from the combustion chamber;

Fig. 5 is a combined sectional and plan view taken along the line 5—5 of Fig. 4;

Fig. 6 is a horizontal sectional view taken in a plane along the line 6—6 of Fig. 4, looking in the direction of the arrows;

Fig. 7 is a vertical sectional view taken in a plane along the line 7—7 of Fig. 6, looking in the direction of the arrows;

Fig. 8 is a fragmentary view, partially in elevation and partially broken away, similar to Fig. 3 and illustrating a modified form of the invention;

Fig. 9 is a combined horizontal sectional and plan view taken along the line 9—9 of Fig. 8;

Fig. 10 is a view similar to Fig. 4 but illustrating a modified form of the invention employing two separate combustion chambers;

Fig. 11 is a front elevational view of the modification illustrated in Fig. 10;

Fig. 12 is a combined horizontal sectional and plan view taken along the line 12—12 of Fig. 11;

Fig. 13 is a horizontal sectional view taken generally along the staggered line 13—13 of Fig. 11; and Fig. 14 is a fragmentary vertical sectional view taken along the line 14—14 of Fig. 11.

In the embodiment of the invention illustrated in Figs. 1-7, a system and apparatus embodying the invention consists in general of a vertical chimney 20 forming a part of a dwelling 22 extending upwardly above the roof 24 thereof where the chimney is provided with an atmospheric vent 26 for discharging the products of combustion to atmosphere. The chimney 20 is supported upon a suitable footing 28 and in its lower part is provided with a combustion chamber 30 provided with means for burning a fuel thereby to generate heated products of combustion. The lower part of the chimney is enlarged to form a cooking range 32 which, as illustrated, may include a horizontally disposed metallic cooking top 34 and an oven 36, access to which is provided by a conventional oven door 38. The range 32 is located in one of the rooms of the dwelling, such as the kitchen.

The system also includes a water heating and storage means which comprises a water storage tank 40 disposed in any suitable place, such as alongside of the chimney, and a water heater 42 disposed within the chimney so as to be heated by the products of combustion. The tank 40 may be suitably connected to the hot and cold water system of the dwelling, and in turn is connected by a cold water pipe 44 to the hot water heater or heat exchanger 42 for supplying water to be heated thereto, and by hot water pipe 46 which returns the heated water from the exchanger 42 to the storage tank 40. The circulation of water between the tank 40 and the exchanger 42 is effected by thermal action due to the heating of the water in the exchanger 42.

Above the combustion chamber 30 and within the chimney a metallic heat exchanger 48 extends longitudinally of the chimney and for a substantial portion of the length thereof. This exchanger may comprise a substantially straight hollow tubular member or pipe which may be formed of porcelain-coated sheet metal pipe, and divides the space within the chimney into a duct 50 for the upward flow of the products of combustion and a duct 52 through which air to be heated is circulated for absorbing heat from the products of combustion through the heat exchanger 48. The duct 50, as illustrated, is arranged within the heat exchanger 48 and extends upwardly from the combustion chamber to the vent 26 for conducting the combustion products to atmosphere. The heat exchanger 48 may in some cases and as illustrated, terminate below the outlet 26, in which event the entire inside of the chimney 20 above the exchanger 48 forms a part of the combustion products duct 50.

The air duct 52 at its upper end is separated from the combustion products duct 50 by a horizontal plate 54 which extends across the inside of the chimney and has a central opening through which the heat exchanger 48 extends. The plate 54 is sealed to the heat exchanger 48 and to the inside wall of the chimney 20 so as to provide a seal between the combustion products duct or path 50 and the air duct or path 52.

The heat exchanger 48 may be supported on and have its interior connected to the interior of a metal case or box 56 which forms a hood or chamber 58 above the combustion chamber 30. The case 56 at its sides and back is provided with a laterally extending flange 60 which is seated upon and sealed to a suitable ledge formed internally of the chimney 20, while the front of the case 56 seats on a ledge provided by the bottom of an opening 62 formed in the front face of the chimney. The front of the case 56 is closed and sealed by a removable panel 64 through openings in which the pipes 44 and 46 extend. The bottom horizontal wall 66 of the case 56 is provided with an opening 68, and a sliding damper 70 formed of tile or other suitable material is arranged within the case 56 and slidably supported upon the bottom wall 66 thereof.

The damper 70 may be positioned as illustrated in full lines in Fig. 3 so that the products of combustion from the combustion chamber are directed through the opening 68 toward the water heater 42, or the damper 70 may be positioned as shown in dotted lines in Fig. 3 directly below the water heater 42 so as partially to shield the same from the combustion products and direct the same through the back part of the opening 68 directly below the interior of the heat exchanger 48.

Rods 72 connected to the damper 70 and extending through the plate 64 at their front are connected by a handle 74 and form a control which for convenience may be designated as a water heater control. By pulling the handle 74 forwardly from the position illustrated in Fig. 3, the damper 70 may be set so as to reduce the rate at which and the temperature to which the water in the heater 42 is heated by the combustion products during the operation of the system. The heater 42 may comprise a hollow metal body and have a plurality of fins 76 depending therefrom so as to be contacted by the combustion products when the damper 70 is positioned as illustrated in full lines in Fig. 3.

The combustion chamber 30 is arranged in the lower portion of the chimney 20 and may have its sides formed by a wall of fire brick 78. Means are provided in the combustion chamber 30 for burning fuel, such for example as coal, and may comprise a fire box 80 the bottom of which is closed by grates 82. An ash pit 84 is provided in the chimney below the grates 82. The front of the combustion chamber may be closed by a panel 86 suitably secured to a face around the opening into the combustion chamber 30 and ash pit 84, and the panel 86 may be provided with an opening closed by a door 88 through which fuel may be introduced into the fire box 80, and an opening closed by the door 90 through which ashes may be removed from the ash pit 84. A draft door 92 is also provided in order to control the amount of air supplied to the combustion chamber so as to regulate the rate of fuel combustion therein.

The combustion chamber 30 at its top is provided with an outlet 94 through which combustion products may flow into the interior of the case 56 through the opening 68. This outlet 94 is controlled by a rotary valve or damper comprising a stationary part 96 and a rotary part 98, the lower part 96 having an upwardly extending flange 100 which defines a rotary seat for the damper member 98. Both of the members 96 and 98 are provided with a plurality of openings 102 (Fig. 4A) which are adapted to be aligned so as to permit the flow of combustion products through the outlet 94, or which openings might be arranged out of alignment as illustrated in Fig. 4A so as to prevent the escape of combustion products from the combustion chamber 30 through the outlet 94.

Assuming that the damper 98 is positioned so that the outlet 94 is open, combustion products generated in the chamber 30 will flow through the outlet 94 and opening 68 through the chamber 58 and through the combustion products path 50 to the atmospheric vent 26 thereby heating the heat exchanger 48 as well as the case 56 which, in fact, is a part of the heat exchanger for heating air, inasmuch as the air which is circulated through the air path 52 circulates over the outside surfaces of the case 56 before escaping through outlets such as 104 to the space in the dwelling to be heated. As illustrated in Fig. 1, no room partitions are illustrated, but they normally would be and the outlets 104 would be arranged to discharge heated air into the space or the various rooms to be heated.

Air under a pressure in excess of that of the products of combustion in the combustion products path or duct 50 is supplied to the upper end of the air path 52 by a blower 106, the outlet 108 of the blower being connected to an opening in the upper wall of the chimney 20 just below the plate 54, while the intake side of the blower is connected to a duct 110 which communicates through a lateral duct 112 and a vertical duct 114 with a return air opening 116 formed in the wall of the space to be heated adjacent the lower end thereof. The duct 114 may be formed between the studding of the dwelling, and the duct 112 may be formed between the joists which form the ceiling over the space to be heated. The duct 110 may communicate through a suitable header with one or more ducts such as 112 for conducting air from the space to be heated to the intake side of the blower, which in turn delivers the same under pressure to the air path 52 thereby setting up a circulation of air downwardly through the path 52 for absorbing heat from the heat exchanger 48 and outwardly through the various outlets 104 in the different parts of the space to be heated.

The duct 110, blower 106, and motor 118 for driving the blower 106 may, as illustrated in Fig. 1, be arranged in the attic space below the roof 24. The motor 118 may be electrically driven, and the circuit 124 of which may be controlled by a thermostatic switch 120 having a thermal element 122 positioned in the stack or combustion products duct 50 just above the upper end of the heat exchanger 48. The switch 120 may be set, for example, so as to cause the motor to drive the blower 106 when the temperature of the combustion products at the thermal element 122 reaches 225° F. and to discontinue operation of the blower when the temperature at such point drops to 125° F. A manual switch 126 may be included in the motor circuit 124 so as to prevent operation of the blower 106 under the conditions hereinafter specified.

A by-pass 128 normally closed by a damper 130 is provided between the upper end of the air path 52 and that part of the combustion products path 50 above the plate 54 so that when the damper 130 is open heated air may be vented from the path 52 in order to dissipate heat from the exchanger 48. This by-pass 128 may be provided by a suitable opening formed in the chimney wall closed by a plate 132, and thermostatically controlled damper 130 may be pivoted to the plate 132 so as to move between the full and dotted line positions illustrated in Fig. 3 and may be thermostatically operated so that when the temperature at the upper end of the air path 52 exceeds a predetermined amount the damper 130 will open and vent the heated air from the air path 52 into the combustion products path 50 and thereby to atmosphere through the vent 26.

The thermostatically controlled damper 130 may be set so as to open the by-pass 128 when the temperature at the upper end of the air path exceeds a predetermined degree, and in case of the failure of the blower 106 to operate through current or motor failure will permit the dissipation of heat from the heating system.

Also, when it is desired to generate heated products of combustion in the combustion chamber 30 without supplying heated air to the space in the dwelling, the switch 126 may be opened and the heated air in the path 52 may be vented to atmosphere through the by-pass 128.

As the bottom of the path is open to the space to be heated through the outlets 104, a thermal circulation of air upwardly through the path 52 will absorb heat from the exchanger 48 and dissipate the same through the by-pass 128 and flue 50 to atmosphere. This system of dissipating heat from the chimney furnace is more particularly described and claimed in my copending application Serial No. 457,065, filed September 2, 1942, for "Heating apparatus," to which reference may be had for further details if desired.

The range part 32 of the system is formed by an enlargement of the lower part of the chimney, and the side walls of the enlargement define a space below the cooking top 34 in which the oven 36 is arranged. The oven 36 may consist of a sheet metal box open at the front and adapted to be closed by the door 38 which is hinged to a frame 134. The oven 36 is arranged in spaced relation with the walls which define the space below the cooking top 34 so as to provide for ducts, flues or passageways through which the products of combustion may be circulated for heating the cooking top 34 as well as the oven 36. The top of the oven is spaced well below the cooking top 34 so as to define a flue 136, the bottom of the flue being defined by a wall 138 which overlies the oven so as to shield it from the flue gases. The flue at its left hand end (Fig. 4) communicates with an opening 140 formed in the walls of the combustion chamber 30 and through which opening or outlet 140 products of combustion from the combustion chamber 30 are supplied to the flue 136 only when the damper 96, 98 is closed. A rod 142 connected to the rotary damper 98 extending through the front wall of the chimney is provided with a handle 144 which may be manipulated for opening and closing the damper 96, 98, and this handle 144, rod 142, and damper 96, 98 may for convenience herein be designated as a range control in that when the damper 96, 98 is open the combustion products will pass directly from the combustion chamber 30 to the heat exchanger 48, whereas when the damper 96, 98 is closed the combustion products will pass through outlet 140 into the flue 136 below the cooking top 34. In order to insure proper heating of the cooking top 34 a baffle 146 may extend partially across flue 136 so that the products of combustion before passing to the outlet flue 148 will circulate around and below the cooking top 34.

The cooking top 34 may consist of a metal plate removably arranged in a seat formed by a frame 150, and a removable lid 152 may be provided in the top 34 so as to obtain a faster cooking action when the lid 152 is removed and a cooking utensil is arranged over the hole normally closed by the lid 152.

The outlet flue 148, as illustrated in Fig. 6, at its right hand end communicates with the flue 136 above the oven 36, and at its left hand end communicates at its top with the space below the case 56. When the damper 154 which controls the flow of the products of combustion from the flue 136 into the flue 148 is open, the products of combustion will pass into the flue 148 and thence upwardly through the opening 68 into the hood 58 and thence into the heat exchanger 48.

The damper 154 is adapted to be manipulated by a handle 156 which is positioned above the frame 150 and this handle 156 and damper 154 may for convenience be referred to as an oven control.

When the damper 154 is closed the products of combustion then will be forced to pass downwardly through the flue 158 at the side of the oven and through the space 160 below the oven, and from there may escape through a flue 162 into the space 164 behind the fire brick wall 78 of the combustion chamber 30. From the space 164 the products of combustion pass upwardly through the opening 68 and into the combustion products path 50. The top of the flue 162 is defined by a horizontal partition 166 which extends behind the oven 36 and below the damper 154.

From the foregoing, therefore, it will be apparent that when the range control is set so as to permit the direct flow of the products of combustion from the combustion chamber 30 to the combustion products path 50, heated air will be supplied to the space in the dwelling during the operation of the blower 106.

At all times the control of water heating may be obtained by positioning of the damper 70 which, for convenience, may be referred to as the water heater control.

If the blower 106 does not operate, the damper 130 will open the by-pass 128 and vent the heated air from the air path 52. If in the summer time hot water is desired without having heated air supplied to the dwelling, the switch 126 can be opened and the combustion chamber 30 operated so as to generate heated products of combustion which may be used solely for heating water in the heat exchanger 42. Such heat as may be absorbed by the heat exchanger 48 will, if excessive, be dissipated through the by-pass 128 which will open when the temperature exceeds a predetermined amount. The thermostatically controlled damper 130 is set so that it will not open below the temperature at which the thermostatic switch cuts in the motor blower 118.

If at such time as the system is being operated for heating water, it is desired to utilize the heated products of combustion for cooking purposes, the range control 96, 98 is set so as to force the products of combustion through the outlet 140 from the combustion chamber 30. If the oven control 154 is open, only the cooking top 34 will be heated, whereas if the oven control 154 is closed the oven 36 will be heated as well as the cooking top 34. If at the time that heat is being utilized for cooking purposes the switch 126 is open, no heated air will be supplied to the space in the dwelling, but of course during the winter season it will be desired to have heated air supplied to the space in the dwelling, and at this time the switch 126 should be closed.

If at such time the heat absorbed by the cooking range for cooking purposes is so great that the air being discharged from the air path 52 is not sufficiently warm, the return of air to the blower 106 may be restricted and to this end I have provided a damper 170 in the conduit 110. This damper normally may be open as shown in dotted line position in Fig. 3. A manual control consisting of a chain 172 and a lever 174 fixed to the damper 170 to rotate therewith but on the outside of the duct 110 may be provided for holding the damper 170 in the dotted line position shown in Fig. 3. A series of suitable hooks 175 at different elevations may be provided for engaging with the eye 176 on the end of the chain, and a spring 178 hooked to the other end of the lever 174 may be provided for urging the damper 170 to a closed position. By selectively engaging the eye 176 with the various hooks 175, the damper 170 may be positioned so as to control the supply of air to the blower 106 thereby restricting the amount of air circulated over the heat exchanger 48 to an amount which will insure that the air discharged from the outlets 104 will be warm.

The height of the chimney 20 and the size of the flue 50 are such as to produce a high potential draft through the combustion chamber 30 and the efficient combustion of fuel therein. Of course when the outlet 94 is closed by the range control 96, 98 the products of combustion must flow through the range in either of two ways, depending upon the setting of the oven control 154, 156. If it is desired to have forced draft of the products of combustion at such time as the heated products of combustion are utilized for cooking purposes, an arrangement embodying the principles of construction illustrated in my application Serial No. 397,055, filed June 7, 1941, for "Heating apparatus" might be utilized and as applied to the construction herein disclosed would provide for the flow of the products of combustion under natural draft from the combustion chamber 30 through the chamber 58 and the heat exchanger 48 and flue 50 as will occur in the construction as herein illustrated.

In such modification, however, a forced draft effecting means would be operated when the outlet 94 is closed so as to provide for the forced flow of the products of combustion from the combustion chamber 30 through the range and back to the flue 50 and thence to the outlet 26, this forced draft effecting means being controlled by the range control 96, 98 so as to be operated when the outlet 94 is closed and so as to have the operation of such forced draft effecting means discontinued when the outlet 94 is open.

In the modification illustrated in Figs. 8 and 9, the construction and operation may be the same as that previously described except in the particulars hereinafter set forth, and in those cases where the construction and operation of the parts are the same, the same reference characters have been employed to designate the same parts as in the modification previously described.

In the construction illustrated in Figs. 1–7, the outlets 104 for discharging heated air into the space to be heated are positioned opposite the case 56 just above the top of the combustion chamber 30. In some cases it may be desirable to provide one or more heated air outlets from the chimney at a higher elevation than that at which the outlets 104 are arranged, and in order to provide this without the necessity of building ducts outside of the chimney, I have devised the arrangement disclosed in Figs. 8 and 9 wherein the size of the chimney is not reduced as provided by the corbeling in Figs. 1–7 thereby providing an interior cross sectional area of rectangular shape inside the chimney, as illustrated in Fig. 9. This space is divided by a vertical partition 180 which cooperates with the inside of the chimney to define an air path 52 around the heat exchanger 48 and the combustion products path 50 therein.

At its top the partition 180 is sealed to the sides of the chimney so as to separate the air path 52 on one side of the partition from the space 182 on the other side of the partition. The partition 180 terminates a short distance above the case 56, thereby permitting the flow of heated air beneath the partition 180 and into the space 182 which forms a duct for conducting the heated air vertically to a heated air outlet 184 provided in the wall of the chimney well above the outlet 104 which may be provided opposite the case 56. The heated air outlet 184 may communicate with another room on the same floor on which the range 32 is arranged, or it may communicate with a room on the floor above for supplying heated air thereto.

As the air discharged through the outlet 184 is passed over the same amount of heat exchange surface as that which is discharged through the outlet 104, the temperature of the air discharged at both of such outlets should be substantially the same.

It should be noted that as the pressure of the air to be heated is in excess of that of the combustion products, if there is any leakage between the air path and the combustion products path it will be of air into the combustion products path, and hence there is no possibility of contaminating the air to be heated.

In the modification illustrated in Figs. 10-14 inclusive the system may be the same as that described in the preceding modifications except in the particulars hereinafter set forth, and therefore in Figs. 10-14 the corresponding parts will bear the same reference characters as used in Figs. 1-7, with the numer 2 prefixed thereto.

In this modification the chimney 220 is enlarged at its lower end to provide a range 232. A combustion chamber 230 is arranged in the base of the chimney 220 directly below the heat exchanger 248, the combustion chamber 230 being formed by walls of fire brick 278 and having a fire box 280 arranged therein for burning fuel such as coal. The front of the combustion chamber 230 is closed by a panel 286 having a fuel feed door 288, a draft control 292, and an ash pit door 290 therein. An annular heat exchanger 242 is supported at the upper end of the combustion chamber 230 and forms a part of and support for the heat exchanger 248 and a hood for directing the products of combustion into the heat exchanger 248, the interior thereof forming a part of the flue or combustion products path 250. The path 252 for air to be heated surrounds the heat exchanger 248, and this path may be provided with one or more heated air outlets 2104 at its lower end for discharging heated air into the space to be heated.

The heat exchanger 242 is hollow and forms a water heated to which pipes 244 and 246 are connected, the pipes 244 and 246 in turn being connected to a hot water storage tank like the tank 40 illustrated in Fig. 1. The heat exchanger 242 is provided with a lateral flange 260 which seats upon and is sealed to a suitable ledge formed internally of the chimney and at the top of the fire brick wall 278 which defines the combustion chamber 230. The remainder of the system not illustrated in the modification disclosed in Figs. 10-14 may be exactly the same as that disclosed in Figs. 1-7.

The range 232 in addition to having an oven 236 and a cooking top 234 may be provided with another combustion chamber 231 having fuel burning means 233 associated therewith. The oven 236 may be disposed between the fuel burning means 233 and the combustion chamber 230. If the combustion chamber 231 and fuel burning means 233 are employed in this modification primarily only for cooking purposes, they do not need to be of as large capacity as the combustion chamber 230 and the fuel burning means associated therewith. The fuel burning means 233 may include a fire box 235 having a grate 237 and an ash pit 239 therebelow. The cooking top 234 includes in addition to a portion over the oven, a portion 241 over the combustion chamber 231 and having removable lids 243 through which fuel may be introduced into the fire box 235. An ash pit door 245 is provided in the front of the range as well as a draft control 247.

The products of combustion from the fuel burning means 233 are adapted to heat the cooking top 234 as well as the oven 236, and are directed into the upper part of the combustion chamber 230 through opening 251 and thence into the flue path 250. The products of combustion from the fuel burning means 233 may pass directly below the cooking top 234 through the opening 251, or they may be diverted through a flue 253 down one side and the back of the oven, below the oven, and up the other side of the oven to the opening 251. This circulation is controlled by a damper 255 controlled by a handle 257, the damper 255 and handle 257 forming an oven control. Access to the oven is provided by a door 238. The fuel burning means 233 may be operated simultaneously with or independently of the fuel burning means associated with the combustion chamber 230, depending upon whether air heating, water heating, and/or heat for cooking is desired.

The fuel burning means herein disclosed are all illustrated as being adapted to burn a hard fuel such as coal, but I contemplate that other types of fuel burning means may be provided for burning such fuels as gas or oil, and reference may be had to my application Serial No. 427,734, filed January 22, 1942, for "Heating apparatus," wherein there are disclosed other types of fuel burning means and controls therefor which may be employed in the system herein illustrated in lieu of the particular fuel burning means and controls herein illustrated.

I also contemplate in connection with the modification illustrated in Figs. 10-14 that a different kind of fuel burning means may be provided in connection with the combustion chamber 230 than is provided in connection with the combustion chamber 231 or vice versa, and to this end reference may be had to my application Serial No. 435,813, filed March 23, 1942, for "Heating apparatus," wherein there is disclosed a heating system of the type herein disclosed having a plurality of combustion chambers and fuel burning means associated therewith.

In this modification the combustion chamber 231 and fuel burning means 233 may be of such capacity as to provide enough heated products of combustion for heating hot water in the heat exchanger 242 as well as for heating air through the heat exchanger 248, and for providing heat for cooking purposes. While the combustion chamber 231 and fuel burning means 233 need not have the heat output of the combustion chamber 230 and the fuel burning means associated therewith, there are times of the year, particularly in the spring and fall, when only a small amount of heat is required, and at such time this might be supplied by heated products of combustion generated in the combustion chamber 231.

Likewise, in this modification if it is desired to operate the fuel burning means associated with the combustion chamber 230 for heating water or the fuel burning means associated with the combustion chamber 231 for cooking purposes or for heating water without supplying heated air to the space in the dwelling, the switch 126 may be opened thereby cutting out the operation of the forced air circulating means and permitting the dissipation of heat from the air path 252 through the by-pass 128 as illustrated in Fig. 1.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

The chimney and range as herein illustrated preferably are constructed of masonry, such a brick, precast panels, tile, etc.

I claim:

1. A combination heating and cooking system for a building to be occupied by and for the comfort of human beings comprising a masonry chimney which extends upright from its base to and above the roof of the building and has an atmospheric discharge at its upper end, the lower part of said chimney being enlarged and having therein a combustion chamber and a cooking oven disposed laterally of each other, fuel burning means associated with said combustion chamber and operable for generating heated products of combustion therein, a cooking top arranged above said oven, a heat exchanger member extending longitudinally of and for a substantial portion of the length of said chimney, said heat exchanger member and chimney providing at least part of a path through which said products of combustion flow on their way from said combustion chamber to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a damper controlled by-pass between said combustion chamber and said combustion products path, and means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

2. A combination heating and cooking system for a building to be occupied by and for the comfort of human beings comprising a chimney which extends upright to and above the roof of the building and has an atmospheric discharge at its upper end, the lower part of said chimney being enlarged and having a combustion chamber and a cooking oven therein and an exposed horizontal cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, said air path having a relief vent through which heated air may escape externally of said space during the time said blower is not operating when said fuel burning means are operated for the purpose of heating said cooking top without supplying heated air to said space.

3. A combination heating and cooking system for a building to be occupied by and for the comfort of human beings comprising a chimney which extends upright to and above the roof of the building and has an atmospheric discharge at its upper end, the lower part of said chimney being enlarged and having a combustion chamber and a cooking oven therein and an exposed horizontal cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, and a damper controlled by-pass in one of said flue passages for controlling the circulation of said heated products of combustion in heat exchange relationship with said oven, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said open and cooking top without supplying heated air to said space.

4. A combination heating and cooking system for a building to be occupied by and for the comfort of human beings comprising a masonry chimney which extends upright from its base to and above the roof of the building and has an atmospheric discharge at its upper end, the lower part of said chimney being enlarged and having therein fuel burning means operable for generating heated products of combustion, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, a horizontal cooking surface disposed laterally of said heat exchanger member, flue passages below said cooking surface for conducting heated products of combustion from said combustion chamber in heat exchange relationship therewith and having a lateral communication below the level of said cooking surface and the lower end of said heat exchanger member with said combustion products path, said air blower normally being operated when said heated products of combustion are being generated at a substantial rate, means for preventing the operation of said air blower as aforesaid, and a relief vent at the upper end of said air path for venting said air path so as to dissipate from said heat exchanger member the heat absorbed thereby when said fuel burning means are operated for the purpose of heating said cooking surface without supplying heated air to said space.

5. A combination air and water heating and cooking system for a building to be occupied by and for the comfort of human beings comprising a masonry chimney which extends upright to and above the roof of the building and has an atmospheric discharge at its upper end, the lower part of said chimney being enlarged and having therein a cooking oven and fuel burning means operable for generating heated products of combustion, a cooking top arranged above said oven, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a water heater arranged in said chimney in heat exchange relationship with said combustion products path, said oven and cooking top being arranged relative to the flow of the combustion products between said fuel burning means and said combustion products path so that heated products of combustion from said fuel burning means may be supplied to said combustion products path either with or without heating said oven and cooking top, said air blower normally being operated when said heated products of combustion are being generated at a substantial rate, means for preventing the operation of said air blower as aforesaid, and a relief vent at the upper end of said air path for venting said air path so as to dissipate from said heat exchanger member the heat absorbed thereby when said fuel burning means are operated for the purpose of heating said cooking top, oven and water heater or said water heater alone, without supplying heated air to said space.

6. A combination air and water heating and cooking system for a building to be occupied by and for the comfort of human beings comprising a masonry chimney which extends upright to and above the roof of the building and has an atmospheric discharge at its upper end, the lower part of said chimney being enlarged and having therein a cooking oven and fuel burning means operable for generating heated products of combustion, a cooking top arranged above said oven, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a water heater arranged in said chimney in heat exchange relationship with said combustion products path, said oven and cooking top being arranged relative to the flow of the combustion products between said fuel burning means and said combustion products path so that heated products of combustion from said fuel burning means may be supplied to said combustion products path either with or without heating said oven and cooking top, said air blower normally being operated when said heated products of combustion are being generated at a substantial rate, means for preventing the operation of said air blower as aforesaid, a relief vent at the upper end of said air path for venting said air path so as to dissipate from said heat exchanger member the heat absorbed thereby when said fuel burning means are operated for the purpose of heating said cooking top, oven and water heater or said water heater alone, without supplying heated air to said space, and a damper controlled by-pass in one of said flue passages for controlling the circulation of said heated products of combustion in heat exchange relationship with said oven.

7. A combination heating and cooking system for a building to be occupied by and for the comfort of human beings comprising a masonry chimney which extends upright from its base to and above the roof of the building and has an atmospheric discharge at its upper end, the lower part of said chimney being enlarged and having therein a combustion chamber and a cooking oven disposed laterally of each other, fuel burning means associated with said combustion chamber and operable for generating heated products of combustion therein, a cooking top arranged above said oven, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, an electric motor for driving said blower, a circuit for said motor including a thermostatic switch responsive to changes in temperature in the combustion products path for opening and closing said circuit, the other end of said air path having an outlet for discharging heated air into the space in said building during operation of said blower, flue passages below said cooking top for conducting heated products of combustion from said combustion chamber in heat exchange relationship with said oven and said cooking top and having a communication with said combustion products path, and another fuel burning means arranged in said chimney below said heat exchanger member and operable independently of or simultaneously with said first mentioned fuel burning means for generating heated products of combustion and supplying the same to the lower end of said combustion products path.

8. A combination heating and cooking system for a building to be occupied by and for the comfort of human beings comprising a chimney which extends upright to and above the roof of the building and has an atmospheric discharge at its upper end, the lower part of said chimney being enlarged and having a combustion chamber and a cooking oven therein and an exposed horizontal cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, an electric motor for driving said blower, a circuit for said motor including a thermostatic switch responsive to changes in temperature in the combustion products path for opening and closing said circuit, the other end of said air path having an outlet for discharging heated air into the space in said building during operation of said blower, flue passages below said cooking top for conducting heated products of combustion from said combustion chamber in heat exchange relationship with said oven and said cooking top and having a communication with said combustion products path, said air path having a relief vent through which heated air may escape externally of said space when said fuel burning means are operated for the purpose of heating said cooking top without supplying heated air to said space, and another fuel burning means arranged in said chimney below said heat exchanger member and operable independently of or simultaneously with said first mentioned fuel burning means for generating heated products of combustion and supplying the same to the lower end of said combustion products path.

9. A combination heating and cooking system for a building to be occupied by and for the comfort of human beings comprising a chimney which extends upright to and above the roof of the building and has an atmospheric discharge at its upper end, the lower part of said chimney being enlarged and having a combustion chamber and a cooking oven therein and an exposed horizontal cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, an electric motor for driving said blower, a circuit for said motor including a thermostatic switch responsive to changes in temperature in the combustion products path for opening and closing said circuit, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a damper controlled by-pass in one of said flue passages for controlling the circulation of said heated products of combustion in heat exchange relationship with said oven, and another fuel burning means arranged in said chimney below said heat exchanger member and operable independently of or simultaneously with said first mentioned fuel burning means for generating heated products of combustion and supplying the same to the lower end of said combustion products path.

10. A combination heating and cooking system for a building to be occupied by and for the comfort of human beings comprising a masonry chimney which extends upright from its base to and above the roof of the building and has an atmospheric discharge at its upper end, the lower part of said chimney being enlarged and having therein fuel burning means operable for generating heated products of combustion, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, an electric motor for driving said blower, a circuit for said motor including a thermostatic switch responsive to changes in temperature in the combustion products path for opening and closing said circuit, the other end of said air path having an outlet for discharging heated air into the space in said building during operation of said blower, a horizontal cooking surface disposed laterally of said heat exchanger member, flue passages below said cooking surface for conducting heated products of combustion from said combustion chamber in heat exchange relationship therewith and having a lateral communication below the level of said cooking surface and the lower end of said heat exchanger member with said combustion products path, said air blower normally being operated when said heated products of combustion are being generated at a substantial rate, means for preventing the operation of said air blower as aforesaid, a relief vent at the upper end of said air path for venting said air path so as to dissipate from said heat exchanger member the heat absorbed thereby when said fuel burning means are operated for the purpose of heating said cooking surface without supplying heated air to said space, and another fuel burning means arranged in said chimney below said heat exchanger member and operable independently of or simultaneously with said first mentioned fuel burning means for generating heated products of combustion and supplying the same to the lower end of said combustion products path.

11. A combination air and water heating and cooking system for a building to be occupied by and for the comfort of human beings comprising a masonry chimney which extends upright to and above the roof of the building and has an atmospheric discharge at its upper end, the lower part of said chimney being enlarged and having therein a cooking oven and fuel burning means operable for generating heated products of combustion, a cooking top arranged above said oven, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, an electric motor for driving said blower, a circuit for said motor including a thermostatic switch responsive to changes in temperature in the combustion products path for opening and closing said circuit, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a water heater arranged in said chimney in heat exchange relationship with said combustion products path, said oven and cooking top being arranged relative to the flow of the combustion products between said fuel burning means and said combustion products path so that heated products of combustion from said fuel burning means may be supplied to said combustion products path either with or without heating said oven and cooking top, said air blower normally being operated when said heated products of combustion are being generated at a substantial rate, means for preventing the operation of said air blower as aforesaid, and a relief vent at the upper end of said air path for venting said air path so as to dissipate from said heat exchanger member the heat absorbed thereby when said fuel burning means are operated for the purpose of heating said cooking top, oven and water heater or said water heater alone, without supplying heated air to said space, said fuel burning means including two parts, one part of which is arranged below said heat exchanger member and operable independently of or simultaneously with the other part of said fuel burning means for generating heated products of combustion and supplying the same to the lower end of said combustion products path.

12. A combination heating and cooking system for a building to be occupied by and for the comfort of human beings comprising a masonry chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

13. A combination heating and cooking system for a building to be occupied by and for the comfort of human beings comprising a masonry chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, and oven control means for preventing the circulation of said combustion products in heat exchange relationship with said oven, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

14. A combination heating and cooking system for a building to be occupied by and for the comfort of human beings comprising a masonry chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, and range control means for preventing the circulation of said combustion products in heat exchange relationship with said cooking top, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said cooking top without supplying heated air to said space.

15. A combination heating and cooking system for a building to be occupied by and for the comfort of human beings comprising a masonry chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, a water heater in heat exchange relationship with said combustion products path, flue passages below said cooking top for conducting heated products of combustion from said combustion chamber in heat exchange relationship with said oven and said cooking top and having a lateral communication below the level of said cooking top and the lower end of said heat exchanger member with said combustion products path, and means for regulating the amount of heat absorbed by said water heater from said combustion products, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

16. A combination heating and cooking system for a building to be occupied by and for the comfort of human beings comprising a masonry chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, and flue passages below said cooking top for conducting heated products of combustion from said combustion chamber in heat exchange relationship with said oven and said cooking top and having a lateral communication below the level of said cooking top and the lower end of said heat exchanger member with said combustion products path, said air path having a relief vent through which heated air may escape externally of said space during the time said blower is not operating when said fuel burning means are operated for the purpose of heating said cooking top and oven without supplying heated air to said space.

17. A combination heating and cooking system for a building to be occupied by and for the comfort of human beings comprising a chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney and vertically arranged above said combustion chamber, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, and a damper controlled by-pass between said combustion chamber and the lower end of said combustion products path and around said flue passages, said by-pass when closed preventing the heating of said cooking top and oven by the combustion products generated in said combustion chamber, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

18. A combination heating and cooking system for a building to be occupied by and for the comfort of human beings comprising a chimney which extends upright from its base to and above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combushion chamber and operable for generating heated products of combustion therein, a heat exchanger member extending longitudinally of and for a substantial portion of the length of said chimney and vertically arranged above said combustion chamber, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a damper controlled by-pass between said combustion chamber and the lower end of said combustion products path and around said flue passages, said by-pass when closed preventing the heating of said cooking top and oven by the combustion produces generated in said combustion chamber, and means for preventing the heating of said oven by said combustion products when said damper controlled by-pass is open, means for preventing the operation of said air blower as aforesaid without interfering with the generation of heated products of combustion, and a relief vent at the upper end of said air path for automatically venting said air path externally of said space so as to dissipate from said heat exchanger member the heat absorbed thereby when said fuel burning means are operated for the purpose of heating said oven and cooking top without supplying heated air to said space.

19. A combintion heating and cooking system for a building to be occupied by and for the comfort of human beings comprising a chimney which extends upright from its base and to above the roof of said building and has an atmospheric discharge at its upper end, a lower part of said chimney being enlarged to form a cooking range and having a combustion chamber therein, said range including a cooking top and an oven disposed below and in spaced relationship with said cooking top, fuel burning means associated with said combustion chamber and operable for generating heated products of combustion therein, a heat exchanger member extending longitudinally of and for a substantial portion of the length of said chimney and vertically arranged above said combustion chamber, said heat exchanger member and chimney providing a path through which said products of combustion flow on their way to said atmospheric discharge and a separate path for the flow of air in intimate heat exchange relationship with at least a part of said combustion products path, means including an air blower operable to supply from the space in said building and to one end of said air path, air to be heated and under a pressure greater than that of the products of combustion in said combustion products path, the other end of said air path having an outlet for discharging heated air into the space in said building during operation of said blower, flue passages below said cooking top for conducting heated products of combustion from said combustion chamber in heat exchange relationship with said oven and said cooking top and having a lateral communication below the level of said cooking top and the lower end of said heat exchanger member with said combustion products path, a damper controlled by-pass between said combustion chamber and the lower end of said combustion products path and around said flue passages, said by-pass when closed preventing the heating of said cooking top and oven by the combustion products generated in said combustion chamber, and means for preventing the heating of said oven by said combustion products when said damper controlled by-pass is open, said air path having a relief vent through which heated air may escape externally of said space when said fuel burning means are operated for the purpose of heating said cooking top and oven without supplying heated air to said space.

20. A combination heating and cooking system for a building to be occupied by and for the comfort of human beings comprising a masonry chimney which extends upright from its base to and above the roof of said building and has an atmospheric discharge at its upper end, the lower part of said chimney being enlarged to form a cooking range and having a combustion chamber therein, said range including a cooking top and an oven disposed laterally of said combustion chamber and in spaced relationship with said cooking top, fuel burning means associated with said combustion chamber and operable for generating heated products of combustion therein, a hollow heat exchanger member extending longitudinally of and for a substantial portion of the length of said chimney, said heat exchanger member and chimney providing a path through which said products of combustion flow on their way to said atmospheric discharge and a separate path for the flow of air in intimate countercurrent heat exchange relationship with at least a part of said combustion products path, means including an air blower operable to supply from the space in said building and to the upper end of said air path, air to be heated and under a pressure greater than that of the products of combustion in said combustion products path, the lower end of said air path having one or more outlets for discharging heated air into the space in said building during operation of said blower, flue passages below said cooking top for conducting heated products of combustion in heat exchange relationship with said oven and said cooking top, the ends of said flue passages having lateral communications below the level of said cooking top and the lower end of said heat exchanger member with said combustion chamber and said combustion products path, said combustion chamber being disposed directly below said heat exchanger member, and a damper controlled by-pass affording direct communication when open between said combustion chamber and the interior of said heat exchanger member, means for preventing the operation of said air blower as aforesaid without interfering with the generation of heated products of combustion, and a relief vent at the upper end of said air path for automatically venting said air path externally of said space so as to dissipate from said heat exchanger member and heat absorbed thereby when said fuel burning means are operated for the purpose of heating said oven and cooking top without supplying heated air to said space.

MORITZ L. MUELLER.